Dec. 6, 1927.  1,651,750

O. BROPHY

PYROMETER THERMOCOUPLE

Filed March 27, 1923

Inventor:
Oscar Brophy
By P. DeWitt Goodwin
Attorney

Patented Dec. 6, 1927.

1,651,750

UNITED STATES PATENT OFFICE.

OSCAR BROPHY, OF PHILADELPHIA, PENNSYLVANIA.

PYROMETER THERMOCOUPLE.

Application filed March 27, 1923. Serial No. 628,015.

My invention relates to a protective coating for a pyrometer thermocouple adapted for measuring high temperatures. My invention is adapted for thermocouples having two elements which are exposed to the heat and it is also particularly adapted for the type of pyrometer having a central element encased in a tubular element.

The object of my invention is to provide means for prolonging the life of a pyrometer thermocouple, adapted for measuring the temperature of molten metal; a further object of my invention is to apply the protective coating upon the outer surface of the elements of a thermocouple or upon the outer surface of the tubular element of a thermocouple, thus avoiding the necessity of using a protective tube, or sheath, into which the thermocouple is usually encased when measuring the temperature of molten metal; and a still further object of my invention is to apply the protective coating directly upon the surface of the thermocouple element, or elements, exposed to the high temperature and thus avoid any lag in the reading of the indicating instrument.

Figure 1:
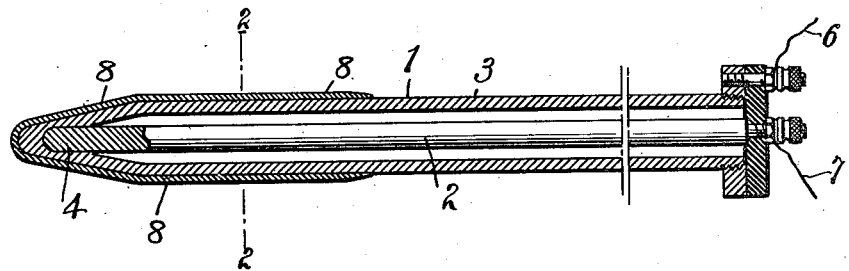
Figure 2:
Figure 3:
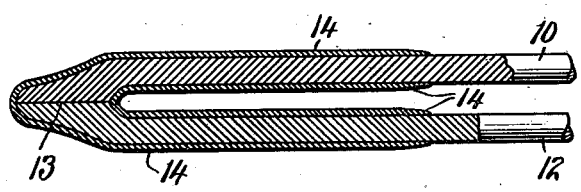

Referring to the accompanying drawing; Fig. 1, is a central longitudinal sectional view of my improved pyrometer thermocouple; Fig. 2, is a transverse section on line 2—2 Fig. 1, and Fig. 3, is a longitudinal sectional view of a different form of thermocouple.

In Figs. 1 and 2 of the drawing is shown a form of pyrometer thermocouple 1, consisting of a central wire element 2, which is enclosed within a tubular element 3. The central element 2 is welded at the point 4 to the tubular element 3. Said elements are electrically connected with conductors 6 and 7, which are connected with a measuring instrument, (not shown in the drawing), adapted to indicate a difference of potential in the circuit, when heat is applied to the thermocouple. Said difference of potential being caused by the action of heat upon the different metals of which the elements 2 and 3 are formed, in a manner well known in the art.

The present invention relates to the protective coating 8 formed upon the outer surface of the tubular element 3. Said coating 8 extends over the portion of the tube 3 which is inserted into the molten metal.

The coating 8 formed upon the tubular element 3 consists of a thin layer of a substance which will not dissolve in the particular metal, the temperature of which is being measured.

The metal coating 8 upon the tubular element 3 may consist of molybdenum, tungsten, ferromolybdenum, ferrotungsten, or other suitable metal.

The method of applying the coating 8 upon the tubular element 3, consists of alloying, or combining chemically the metal forming the coating 8, with the tubular element 3. For example, the tubular element 3, which is an iron tube, is coated with molybdenum and then subjected to heat treatment, thus forming a coating of ferromolybdenum.

Fig. 3, of the drawing illustrates a different form of pyrometer thermocouple, consisting of elements 10 and 12 of different metals, welded together at the portion 13, which is adapted to be inserted into the molten metal. The protective coating 14 is applied to the surfaces of both elements 10 and 12, in the above described manner.

By my improved method of forming a protective coating upon the element, or elements, of the thermocouple, a very thin coating is formed thereon which will not appreciably retard the flow of heat to the welded juncture of the two elements of the thermocouple, and the coating will protect said element, or elements, from deterioration due to the intense heat of the molten metal.

Heretofore it has been the practice to encase the thermocouple in a protective sheath, or tube, which necessitated a small air space between the sheath, and the thermocouple. Said air space prevented the heat from acting quickly upon the thermocouple and thus more time was required for the thermocouple to attain its maximum temperature, due to said air space retarding the flow of heat to the thermocouple. In my improved form of thermocouple the use of a protective sheath, is dispensed with and the air space is thus eliminated. The protective coating is made a part of the thermocouple element or elements. By this means the lag in obtaining a reading on the indicating instrument is almost eliminated, as the thermocouple comes very quickly to the temperature of the material into which it is inserted.

Having thus described my invention I claim and desire to secure by Letters Patent:

1. A thermocouple adapted to be immersed in molten metals, a metallic coating upon the thermocouple, said coating being integral with the metal of the thermocouple and insoluble in said molten metals.

2. A thermocouple, having a tubular element and a second element enclosed therein, adapted to be immersed in molten metals, a metallic coating upon the tubular element, said coating being integral with the metal of the tubular element and insoluble in the molten metals.

In testimony whereof I affix my signature.

OSCAR BROPHY.